US012812564B2

(12) United States Patent
Ling et al.

(10) Patent No.: US 12,812,564 B2
(45) Date of Patent: Nov. 24, 2026

(54) METHODS AND APPARATUSES FOR DETERMINING VIRTUAL PHR

(71) Applicant: LENOVO (BEIJING) LIMITED, Beijing (CN)

(72) Inventors: Wei Ling, Beijing (CN); Yi Zhang, Beijing (CN); Chenxi Zhu, Fairfax, VA (US); Bingchao Liu, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 116 days.

(21) Appl. No.: 18/860,191

(22) PCT Filed: Apr. 28, 2022

(86) PCT No.: PCT/CN2022/089946
§ 371 (c)(1),
(2) Date: Oct. 25, 2024

(87) PCT Pub. No.: WO2023/206252
PCT Pub. Date: Nov. 2, 2023

(65) Prior Publication Data
US 2025/0294477 A1 Sep. 18, 2025

(51) Int. Cl.
*H04W 52/36* (2009.01)
*H04L 5/00* (2006.01)

(52) U.S. Cl.
CPC ......... *H04W 52/365* (2013.01); *H04L 5/0044* (2013.01)

(58) Field of Classification Search
CPC ... H04W 52/36; H04W 52/365; H04W 72/21; H04L 5/00; H04L 5/0044
See application file for complete search history.

(56) References Cited

U.S. PATENT DOCUMENTS 11,805,488 B2 * 10/2023 Khoshnevisan .... H04W 52/365
12,075,361 B2 * 8/2024 Yao .................... H04W 52/146
(Continued)

FOREIGN PATENT DOCUMENTS

CN 110536394 A 12/2019
CN 113365337 A 9/2021

OTHER PUBLICATIONS

PCT/CN2022/089946, "Notification of Transmittal of the International Search Report and the Written Opinion of the International Searching Authority, or the Declaration", International Searching Authority, Nov. 29, 2022, pp. 1-7.
(Continued)

*Primary Examiner* — Hai V Nguyen
(74) *Attorney, Agent, or Firm* — Kunzler Needham Hilton

(57) ABSTRACT

Embodiments of the present disclosure relate to methods and apparatuses for determining virtual power headroom report (PHR). According to an embodiment of the present disclosure, a user equipment (UE) can include: a receiver configured to receive configuration information indicating a first control resource set (CORESET) pool index and a second CORESET pool index for an activated bandwidth part (BWP) of a serving cell; a transmitter configured to transmit at least one virtual PHR in a slot, wherein the at least one virtual PHR is determined based on at least one of a first power control parameter set and a second power control parameter set for the activated BWP of the serving cell, wherein the first power control parameter set includes a first pathloss reference signal (PL-RS) and a first set of power control parameters except for PL-RS, and the second power control parameter set includes a second PL-RS and a second set of power control parameters except for PL-RS; and a processor coupled to the transmitter and the receiver.

20 Claims, 2 Drawing Sheets

(56) References Cited

U.S. PATENT DOCUMENTS

| | | | | |
|---|---|---|---|---|
| 12,513,624 | B2 * | 12/2025 | Zhang | H04W 52/146 |
| 2022/0046555 | A1 * | 2/2022 | Khoshnevisan | H04W 52/365 |
| 2022/0201619 | A1 * | 6/2022 | Yao | H04W 52/146 |
| 2024/0179633 | A1 * | 5/2024 | Zhang | H04W 52/146 |
| 2024/0323865 | A1 * | 9/2024 | Yuan | H04W 52/42 |
| 2024/0389101 | A1 * | 11/2024 | Guo | H04W 52/0258 |
| 2025/0168783 | A1 * | 5/2025 | Liu | H04W 72/231 |

OTHER PUBLICATIONS

Nokia et al., "Enhancements on Multi-beam Operation", 3GPP TSG RAN WG1 #106-bis-e R1-2109870, Oct. 11-19, 2021, pp. 1-28.

3GPP, "3rd Generation Partnership Project; Technical Specification Group Radio Access Network; Evolved Universal Terrestrial Radio Access (E-UTRA); Medium Access Control (MAC) protocol specification (Release 17)", 3GPP TS 36.321 V17.0.0, Mar. 2022, pp. 1-146.

3GPP, "3rd Generation Partnership Project; Technical Specification Group Radio Access Network; NR; User Equipment (UE) radio transmission and reception; Part 1: Range 1 Standalone (Release 17)", 3GPP TS 38.101-1 V17.4.0, Dec. 2021, pp. 1-625.

3GPP, "3rd Generation Partnership Project; Technical Specification Group Radio Access Network; NR; User Equipment (UE) radio transmission and reception; Part 2: Range 2 Standalone (Release 17)", 3GPP TS 38.101-2 V17.4.0, Dec. 2021, pp. 1-186.

3GPP, "3rd Generation Partnership Project; Technical Specification Group Radio Access Network; NR; User Equipment (UE) radio transmission and reception; Part 3: Range 1 and Range 2 Interworking operation with other radios (Release 17)", 3GPP TS 38.101-3 V17.4.0, Dec. 2021, pp. 1-938.

3GPP, "3rd Generation Partnership Project; Technical Specification Group Radio Access Network; NR; Physical layer procedures for control (Release 17)", 3GPP TS 38.213 V17.1.0, Mar. 2022, pp. 1-245.

3GPP, "3rd Generation Partnership Project; Technical Specification Group Radio Access Network; NR; Physical layer procedures for data (Release 17)", 3GPP TS 38.214 V17.1.0, Mar. 2022, pp. 1-225.

3GPP, "3rd Generation Partnership Project; Technical Specification Group Radio Access Network; NR; Medium Access Control (MAC) protocol specification (Release 16)", 3GPP TS 38.321 V16.8.0, Mar. 2022, pp. 1-159.

* cited by examiner

METHODS AND APPARATUSES FOR DETERMINING VIRTUAL PHR

TECHNICAL FIELD

Embodiments of the present application generally relate to wireless communication technology, and especially to methods and apparatuses for determining virtual power headroom report (PHR).

BACKGROUND

Wireless communication systems are widely deployed to provide various telecommunication services, such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems, such as long term evolution (LTE) systems, LTE-advanced (LTE-A) systems, or LTE-A Pro systems, and fifth generation (5G) systems which may also be referred to as new radio (NR) systems.

In a wireless communication system, a PHR may be used to report a difference between a maximum transmission power of a user equipment (UE) and an uplink transmission power to a base station (BS), such that the BS may perform power control and determine scheduling information for the UE based on the PHR. The PHR may be classified into actual PHR and virtual PHR. The actual PHR may refer to a PHR determined based on an actual uplink transmission, whereas the virtual PHR may refer to a PHR determined based on a reference uplink transmission. Currently, details regarding how to determine virtual PHR, for example, in multiple downlink control information (M-DCI) based multiple transmit-receive point (M-TRP) scenarios, need to be further discussed.

SUMMARY OF THE APPLICATION

Embodiments of the present application at least provide technical solutions for determining virtual PHR.

According to some embodiments of the present application, a UE may include: a receiver configured to receive configuration information indicating a first control resource set (CORESET) pool index and a second CORESET pool index for an activated bandwidth part (BWP) of a serving cell; a transmitter configured to transmit at least one virtual PHR in a slot, wherein the at least one virtual PHR is determined based on at least one of a first power control parameter set and a second power control parameter set for the activated BWP of the serving cell, wherein the first power control parameter set includes a first pathloss reference signal (PL-RS) and a first set of power control parameters except for PL-RS, and the second power control parameter set includes a second PL-RS and a second set of power control parameters except for PL-RS; and a processor coupled to the transmitter and the receiver.

In some embodiments of the present application, the first power control parameter set is associated with the first CORESET pool index and the second power control parameter set is associated with the second CORESET pool index.

In some embodiments of the present application, the receiver is further configured to receive configuration information indicating to report two PHRs, and in the case that two virtual PHRs are determined to be reported in the slot, the transmitter is configured to: transmit a first virtual PHR based on the first power control parameter set and a second virtual PHR based on the second power control parameter set.

In some embodiments of the present application, the receiver is further configured to receive configuration information indicating to report two PHRs, and in the case that one actual PHR and one virtual PHR are determined to be reported in the slot and the actual PHR is associated with one of the first CORESET pool index and the second CORESET pool index, the transmitter is configured to: transmit the one virtual PHR based on one power control parameter set of the first power control parameter set and the second power control parameter set which is associated with the other of the first CORESET pool index and the second CORESET pool index.

In some embodiments of the present application, the receiver is further configured to receive configuration information indicating to report one PHR, and in the case that one virtual PHR is determined to be reported in the slot, the transmitter is configured to: transmit the one virtual PHR based on the first power control parameter set.

In some embodiments of the present application, the receiver is further configured to receive configuration information indicating to report one PHR; and in the case that one virtual PHR is determined to be reported in the slot, the transmitter is configured to: transmit the one virtual PHR based on one power control parameter set of the first power control parameter set and the second power control parameter set; and transmit an indication indicating whether the virtual PHR is associated with the first CORESET pool index or the second CORESET pool index.

In some embodiments of the present application, the first PL-RS is associated with or included in a first joint or uplink (UL) common transmission configuration indicator (TCI) state with a lowest TCI codepoint among a first set of activated TCI codepoints each including at least one joint or UL common TCI state which is associated with the first CORESET pool index; and the second PL-RS is associated with or included in a second joint or UL common TCI state with a lowest TCI codepoint among a second set of activated TCI codepoints each including at least one joint or UL common TCI state which is associated with the second CORESET pool index.

In some embodiments of the present application, the first PL-RS is associated with or included in a first joint or UL common TCI state associated with the first CORESET pool index which is applicable for UL transmission associated with the first CORESET pool index in the slot; and the second PL-RS is associated with or included in a second joint or UL common TCI state associated with the second CORESET pool index which is applicable for UL transmission associated with the second CORESET pool index in the slot.

In some embodiments of the present application, in the case that one PL-RS list is configured for physical uplink shared channel (PUSCH) transmission of the activated BWP of the serving cell, the first PL-RS is a PL-RS with the lowest ID in the configured PL-RS list and the second PL-RS is a PL-RS with the second lowest ID in the configured PL-RS list; or in the case that a first PL-RS list associated with the first CORESET pool index and a second PL-RS list associated with the second CORESET pool index are configured for PUSCH transmission of the activated BWP of the serving cell, the first PL-RS is a PL-RS with the lowest ID in the first PL-RS list and the second PL-RS is a PL-RS with the lowest ID in the second PL-RS list.

In some embodiments of the present application, in the case that a first joint or UL common TCI state with a lowest TCI codepoint among a first set of activated TCI codepoints each including at least one joint or UL common TCI state which is associated with the first CORESET pool index is associated with a first parameter set within a list of parameter sets for power control configured for PUSCH transmission in the activated BWP of the serving cell, the first set of power control parameters except for PL-RS is determined based on the first parameter set; otherwise, if one list of parameter sets for PUSCH power control is configured for the activated BWP of the serving cell, the first set of power control parameters except for PL-RS is determined based on a parameter set with the lowest ID in the configured list of parameter sets; or if a first list of parameter sets for PUSCH power control associated with the first CORESET pool index and a second list of parameter sets for PUSCH power control associated with the second CORESET pool index are configured for the activated BWP of the serving cell, the first set of power control parameters except for PL-RS is determined based on a parameter set with the lowest ID in the first list of parameter sets; and in the case that a second joint or UL common TCI state with a lowest TCI codepoint among a second set of activated TCI codepoints each including at least one joint or UL common TCI state which is associated with the second CORESET pool index is associated with a second parameter set within a list of parameter sets for power control configured for PUSCH transmission in the activated BWP of the serving cell, the second set of power control parameter sets except for PL-RS is determined based on the second parameter set; otherwise, if one list of parameter sets for PUSCH power control is configured for the activated BWP of the serving cell, the second set of power control parameters except for PL-RS is determined based on a parameter set with the second lowest ID in the configured list of parameter sets; or if a first list of parameter sets for PUSCH power control associated with the first CORESET pool index and a second list of parameter sets for PUSCH power control associated with the second CORESET pool index are configured for the activated BWP of the serving cell, the second set of power control parameters except for PL-RS is determined based on a parameter set with the lowest ID in the second list of parameter sets.

In some embodiments of the present application, in the case that a first joint or UL common TCI state associated with the first CORESET pool index which is applicable for UL transmission associated with the first CORESET pool index in the slot is associated with a first parameter set within a list of parameter sets for power control configured for PUSCH transmission in the activated BWP of the serving cell, the first set of power control parameters except for PL-RS is determined based on the first parameter set; otherwise, if one list of parameter sets for PUSCH power control is configured for the activated BWP of the serving cell, the first set of power control parameters except for PL-RS is determined based on a parameter set with the lowest ID in the configured list of parameter sets; or if a first list of parameter sets for PUSCH power control associated with the first CORESET pool index and a second list of parameter sets for PUSCH power control associated with the second CORESET pool index are configured for the activated BWP of the serving cell, the first set of power control parameters except for PL-RS is determined based on a parameter set with the lowest ID in the first list of parameter sets; and in the case that a second joint or UL common TCI state associated with the second CORESET pool index which is applicable for UL transmission associated with the second CORESET pool index in the slot is associated with a second parameter set within a list of parameter sets for power control configured for PUSCH transmission in the activated BWP of the serving cell, the second set of power control parameters except for PL-RS is determined based on the second parameter set; otherwise, if one list of parameter sets for PUSCH power control is configured for the activated BWP of the serving cell, the second set of power control parameters except for PL-RS is determined based on a parameter set with the second lowest ID in the configured list of parameter sets; or if a first list of parameter sets for PUSCH power control associated with the first CORESET pool index and a second list of parameter sets for PUSCH power control associated with the second CORESET pool index are configured for the activated BWP of the serving cell, the second set of power control parameters except for PL-RS is determined based on a parameter set with the lowest ID in the second list of parameter sets.

In some embodiments of the present application, in the case that one list of parameter sets for PUSCH power control is configured for the activated BWP of the serving cell, the first set of power control parameters except for PL-RS is determined based on a parameter set with the lowest ID in the configured list of parameter sets and the second set of power control parameters except for PL-RS is determined based on a parameter set with the second lowest ID in the configured list of parameter sets; or in the case that a first list of parameter sets for PUSCH power control associated with the first CORESET pool index and a second list of parameter sets for PUSCH power control associated with the second CORESET pool index are configured for the activated BWP of the serving cell, the first set of power control parameters except for PL-RS is determined based on a parameter set with the lowest ID in the first list of parameter sets and the second set of power control parameters except for PL-RS is determined based on a parameter set with the lowest ID in the second list of parameter sets.

In some embodiments of the present application, the receiver is further configured to receive configuration information indicating two sounding reference signal (SRS) resource sets for PUSCH transmission, the first power control parameter set is associated with a first SRS resource set which has a lower ID in the two SRS resource sets, and the second power control parameter set is associated with a second SRS resource set which has a higher ID in the two SRS resource sets.

In some embodiments of the present application, the receiver is further configured to receive configuration information indicating to report two PHRs, and in the case that two virtual PHRs are determined to be reported in the slot, the transmitter is configured to: transmit a first virtual PHR based on the first power control parameter set and a second virtual PHR based on the second power control parameter set.

In some embodiments of the present application, the receiver is further configured to receive configuration information indicating to report two PHRs, and in the case that one actual PHR and one virtual PHR are determined to be reported in the slot and the actual PHR is associated with one of the first SRS resource set and the second SRS resource set, the transmitter is configured to: transmit the one virtual PHR based on one power control parameter set of the first power control parameter set and the second power control parameter set which is associated with the other of the first SRS resource set and the second SRS resource set.

In some embodiments of the present application, the receiver is further configured to receive configuration information indicating to report one PHR, and in the case that one virtual PHR is determined to be reported in the slot, the transmitter is configured to: transmit the one virtual PHR based on the first power control parameter set.

In some embodiments of the present application, the receiver is further configured to receive configuration information indicating to report one PHR; and in the case that one virtual PHR is determined to be reported in the slot, the transmitter is configured to: transmit the one virtual PHR based on one power control parameter set of the first power control parameter set and the second power control parameter set; and transmit an indication indicating whether the virtual PHR is associated with the first SRS resource set or the second SRS resource set.

In some embodiments of the present application, the first PL-RS is associated with or included in a first joint or UL common TCI state with a lowest TCI codepoint of all activated TCI codepoints each including at least one joint or UL common TCI state associated with the first SRS resource set in the activated BWP of the serving cell; and the second PL-RS is associated with or included in a second joint or UL common TCI state with a lowest TCI codepoint of all activated TCI codepoints each including at least one joint or UL common TCI state associated with the second SRS resource set in the activated BWP of the serving cell.

In some embodiments of the present application, the first PL-RS is associated with or included in a first joint or UL common TCI state associated with the first SRS resource set which is applicable for UL transmission in the slot; and the second PL-RS is associated with or included in a second joint or UL common TCI state associated with the second SRS resource set which is applicable for UL transmission in the slot.

In some embodiments of the present application, in the case that one PL-RS list is configured for PUSCH transmission of the activated BWP of the serving cell, the first PL-RS is a PL-RS with the lowest ID in the configured PL-RS list and the second PL-RS is a PL-RS with the second lowest ID in the configured PL-RS list; or in the case that a first PL-RS list associated with the first SRS resource set and a second PL-RS list associated with the second SRS resource set are configured for PUSCH transmission of the activated BWP of the serving cell, the first PL-RS is a PL-RS with the lowest ID in the first PL-RS list and the second PL-RS is a PL-RS with the lowest ID in the second PL-RS list.

In some embodiments of the present application, in the case that a first joint or UL common TCI state with a lowest TCI codepoint of all activated TCI codepoints each including at least one joint or UL common TCI state associated with the first SRS resource set in the activated BWP of the serving cell is associated with a first parameter set within a list of parameter sets for power control configured for PUSCH transmission in the activated BWP of the serving cell, the first set of power control parameters except for PL-RS is determined based on the first parameter set; otherwise, if one list of parameter sets for PUSCH power control is configured for the activated BWP of the serving cell, the first set of power control parameters except for PL-RS is determined based on a parameter set with the lowest ID in the configured list of parameter sets; or if a first list of parameter sets for PUSCH power control associated with the first SRS resource set and a second list of parameter sets for PUSCH power control associated with the second SRS resource set are configured for the activated BWP of the serving cell, the first set of power control parameters except for PL-RS is determined based on a parameter set with the lowest ID in the first list of parameter sets; and in the case that a second joint or UL common TCI state with a lowest TCI codepoint of all activated TCI codepoints each including at least one joint or UL common TCI state associated with the second SRS resource set in the activated BWP of the serving cell is associated with a second parameter set within a list of parameter sets for power control configured for PUSCH transmission in the activated BWP of the serving cell, the second set of power control parameters except for PL-RS is determined based on the second parameter set; otherwise, if one list of parameter sets for PUSCH power control is configured for the activated BWP of the serving cell, the second set of power control parameters except for PL-RS is determined based on a parameter set with the second lowest ID in the configured list of parameter sets; or if a first list of parameter sets for PUSCH power control associated with the first SRS resource set and a second list of parameter sets for PUSCH power control associated with the second SRS resource set are configured for the activated BWP of the serving cell, the second set of power control parameters except for PL-RS is determined based on a parameter set with the lowest ID in the second list of parameter sets.

In some embodiments of the present application, in the case that a first joint or UL common TCI state associated with the first SRS resource set which is applicable for UL transmission in the slot is associated with a first parameter set within a list of parameter sets for power control configured for PUSCH transmission in the activated BWP of the serving cell, the first set of power control parameters except for PL-RS is determined based on the first parameter set; otherwise, if one list of parameter sets for PUSCH power control is configured for the activated BWP of the serving cell, the first set of power control parameters except for PL-RS is determined based on a parameter set with the lowest ID in the configured list of parameter sets; or if a first list of parameter sets for PUSCH power control associated with the first SRS resource set and a second list of parameter sets for PUSCH power control associated with the second SRS resource set are configured for the activated BWP of the serving cell, the first set of power control parameters except for PL-RS is determined based on a parameter set with the lowest ID in the first list of parameter sets; and in the case that a second joint or UL common TCI state associated with the second SRS resource set which is applicable for UL transmission in the slot is associated with a second parameter set within a list of parameter sets for power control configured for PUSCH transmission in the activated BWP of the serving cell, the second set of power control parameters except for PL-RS is determined based on the second parameter set; otherwise, if one list of parameter sets for PUSCH power control is configured for the activated BWP of the serving cell, the second set of power control parameters except for PL-RS is determined based on a parameter set with the second lowest ID in the configured list of parameter sets; or if a first list of parameter sets for PUSCH power control associated with the first SRS resource set and a second list of parameter sets for PUSCH power control associated with the second SRS resource set are configured for the activated BWP of the serving cell, the second set of power control parameters except for PL-RS is determined based on a parameter set with the lowest ID in the second list of parameter sets.

In some embodiments of the present application, in the case that one list of parameter sets for PUSCH power control is configured for the activated BWP of the serving cell, the first set of power control parameters except for PL-RS is determined based on a parameter set with the lowest ID in the configured list of parameter sets and the second set of power control parameters except for PL-RS is determined based on a parameter set with the second lowest ID in the configured list of parameter sets; or in the case that a first list of parameter sets for PUSCH power control associated with the first SRS resource set and a second list of parameter sets for PUSCH power control associated with the second SRS resource set are configured for the activated BWP of the serving cell, the first set of power control parameters except for PL-RS is determined based on a parameter set with the lowest ID in the first list of parameter sets and the second set of power control parameters except for PL-RS is determined based on a parameter set with the lowest ID in the second list of parameter sets.

In some embodiments of the present application, the first set of power control parameters except for PL-RS and the second set of power control parameters except for PL-RS are determined based on a parameter set with the lowest ID in a list of parameter sets for PUSCH power control.

In some embodiments of the present application, a closed loop index in the first set of power control parameters except for PL-RS is determined to be 0, and a closed loop index in the second set of power control parameters except for PL-RS is determined to be 1 in the case that two closed loop indexes are configured and determined to be 0 in the case that only one closed loop index is configured; or a closed loop index in the first set of power control parameters except for PL-RS and a closed loop index in the second set of power control parameters except for PL-RS are determined to be 0 in the case that other parameters in the first set of power control parameters except for PL-RS and the second set of power control parameters except for PL-RS are determined based on a parameter set with the lowest ID in a list of parameter sets for PUSCH power control.

According to some other embodiments of the present application, a base station (BS) may include: a transmitter configured to: transmit first configuration information indicating a first CORESET pool index and a second CORESET pool index for an activated BWP of a serving cell; and transmit second configuration information indicating to report one PHR or two PHRs; and a receiver configured to receive at least one virtual PHR in a slot, wherein the at least one virtual PHR is determined based on at least one of a first power control parameter set and a second power control parameter set for the activated BWP of the serving cell, the first power control parameter set is associated with the first CORESET pool index or a first SRS resource set, and the second power control parameter set is associated with the second CORESET pool index or a second SRS resource set; and a processor coupled to the transmitter and the receiver.

According to some other embodiments of the present application, a method performed by a UE may include: receiving configuration information indicating a first CORESET pool index and a second CORESET pool index for an activated BWP of a serving cell; and transmitting at least one virtual PHR in a slot, wherein the at least one virtual PHR is determined based on at least one of a first power control parameter set and a second power control parameter set for the activated BWP of the serving cell, the first power control parameter set includes a first PL-RS and a first set of power control parameters except for PL-RS, and the second power control parameter set includes a second PL-RS and a second set of power control parameters except for PL-RS.

According to some other embodiments of the present application, a method performed by a BS may include: transmitting first configuration information indicating a first CORESET pool index and a second CORESET pool index for an activated BWP of a serving cell; transmitting second configuration information indicating to report one PHR or two PHRs; and receiving at least one virtual PHR in a slot, wherein the at least one virtual PHR is determined based on at least one of a first power control parameter set and a second power control parameter set for the activated BWP of the serving cell, wherein the first power control parameter set is associated with the first CORESET pool index or a first SRS resource set, and the second power control parameter set is associated with the second CORESET pool index or a second SRS resource set.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

Figure 1:
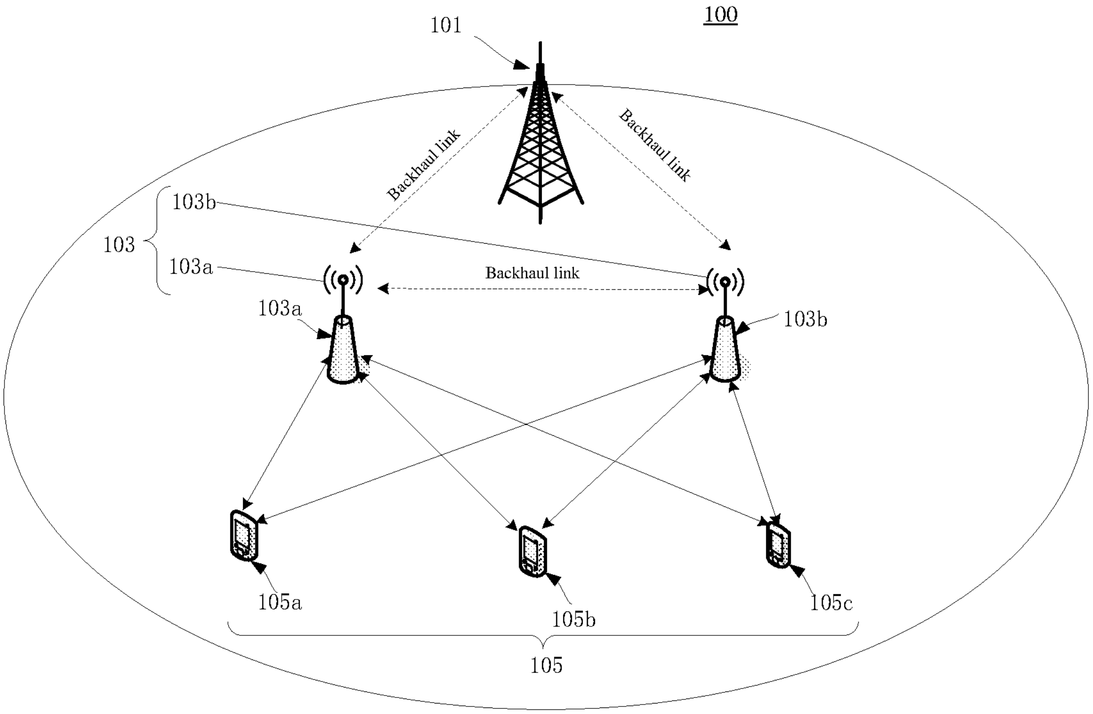
FIG. 1 is a schematic diagram illustrating an exemplary wireless communication system according to some embodiments of the present application.

The detailed description of the appended drawings is intended as a description of the preferred embodiments of the present application and is not intended to represent the only form in which the present application may be practiced. It should be understood that the same or equivalent functions may be accomplished by different embodiments that are intended to be encompassed within the spirit and scope of the present application.

While operations are depicted in the drawings in a particular order, persons skilled in the art will readily recognize that such operations need not be performed in the particular order as shown or in a sequential order, or that all illustrated operations need be performed, to achieve desirable results; sometimes one or more operations can be skipped. Further, the drawings can schematically depict one or more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing can be advantageous.

Reference will now be made in detail to some embodiments of the present application, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE), and so on. It is contemplated that along with the developments of network architectures and new service scenarios, all embodiments in the present application are also applicable to similar technical problems; and moreover, the terminologies recited in the present application may change, which should not affect the principle of the present application.

A wireless communication system generally includes one or more BSs and one or more UEs. Furthermore, a BS may be configured with one TRP (or panel) or more TRPs (or panels). A TRP can act like a small BS. The TRPs can communicate with each other by a backhaul link. Such backhaul link may be an ideal backhaul link or a non-ideal backhaul link. Latency of the ideal backhaul link may be deemed as zero, and latency of the non-ideal backhaul link may be tens of milliseconds and much larger, e.g., on the order of tens of milliseconds, than that of the ideal backhaul link.

In a wireless communication system, one single TRP can be used to serve one or more UEs under control of a BS. In different scenarios, TRP may be called in different terms. Persons skilled in the art should understand that as the 3GPP and the communication technology develop, the terminologies recited in the specification may change, which should not affect the scope of the present application. It should be understood that the TRP(s) (or panel(s)) configured for the BS may be transparent to a UE.

FIG. 1 is a schematic diagram illustrating an exemplary wireless communication system 100 according to some embodiments of the present application.

Referring to FIG. 1, the wireless communication system 100 can include a BS 101, TRPs 103 (e.g., TRP 103*a* and TRP 103*b*), and UEs 105 (e.g., UE 105*a*, UE 105*b*, and UE 105*c*). Although only one BS 101, two TRPs 103 and three UEs 105 are shown for simplicity, it should be noted that the wireless communication system 100 may include more or less communication device(s), apparatus, or node(s) in accordance with some other embodiments of the present application.

The wireless communication system 100 is compatible with any type of network that is capable of sending and receiving wireless communication signals. For example, the wireless communication system 100 is compatible with a wireless communication network, a cellular telephone network, a time division multiple access (TDMA) based network, a code division multiple access (CDMA) based network, an orthogonal frequency division multiple access (OFDMA) based network, an LTE network, a 3GPP-based network, a 3GPP 5G network, a satellite communications network, a high-altitude platform network, and/or other communications networks.

The BS 101 may also be referred to as an access point, an access terminal, a base, a macro cell, a node-B, an enhanced node B (eNB), a gNB, a home node-B, a relay node, or a device, or described using other terminology used in the art. The BS 101 is generally part of a radio access network that may include a controller communicably coupled to the BS 101.

The TRPs 103, for example, the TRP 103*a* and the TRP 103*b*, can communicate with the BS 101 via, for example, a backhaul link. Each of TRPs 103 can serve some or all of the UEs 105. As shown in FIG. 1, the TRP 103*a* can serve some mobile stations (which include the UE 105*a*, the UE 105*b*, and the UE 105*c*) within a serving area or region (e.g., a cell or a cell sector). The TRP 103*b* can serve some mobile stations (which include the UE 105*a*, the UE 105*b*, and the UE 105*c*) within a serving area or region (e.g., a cell or a cell sector). In some other embodiments, the TRP 103*a* and the TRP 103*b* may serve different UEs. The TRP 103*a* and the TRP 103*b* can communicate with each other via, for example, a backhaul link.

According to some embodiments of the present application, the UE(s) 105 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like.

According to some embodiments of the present application, the UE(s) 105 may include a portable wireless communication device, a smart phone, a cellular telephone, a flip phone, a device having a subscriber identity module, a personal computer, a selective call receiver, or any other device that is capable of sending and receiving communication signals on a wireless network.

According to some embodiments of the present application, the UE(s) 105 may include wearable devices, such as smart watches, fitness bands, optical head-mounted displays, or the like.

Moreover, the UE(s) 105 may be referred to as a subscriber unit, a mobile, a mobile station, a user, a terminal, a mobile terminal, a wireless terminal, a fixed terminal, a subscriber station, a user terminal, or a device, or described using other terminology used in the art.

In NR, M-DCI based M-TRP transmission is supported. Specifically, in the M-DCI based M-TRP transmission, each TRP will schedule downlink (DL) and UL transmissions associated with the TRP independently. In NR Rel-18, one research topic is to specify extension of Rel-17 Unified TCI framework for indication of multiple DL and UL TCI states focusing on M-TRP use case, using Rel-17 unified TCI framework. That is, in NR Rel-18, M-DCI based M-TRP transmission based on common beam framework will be further studied.

In NR Rel-17, only one PHR is supported in common beam framework. For M-DCI based M-TRP transmission based on common beam framework, whether only one PHR or two PHRs are supported needs to be further studied considering that multiple panel simultaneous UL transmission will be studied in NR Rel-18. In addition, when one PHR or two PHRs are supported for M-DCI based M-TRP transmission based on common beam framework, how to determine one or two virtual PHRs for reporting also needs to be studied.

Given the above, embodiments of the present application propose solutions for virtual PHR determination in M-DCI based M-TRP transmission based on common beam framework. For example, embodiments of the present application propose solutions regarding how to determine two power control parameter sets for virtual PHR determination, how to determine one or two virtual PHRs when two PHRs need to be reported, and how to determine one virtual PHR when only one PHR needs to be reported. More details on embodiments of the present application will be described in the following text in combination with the appended drawings.

Figure 2:
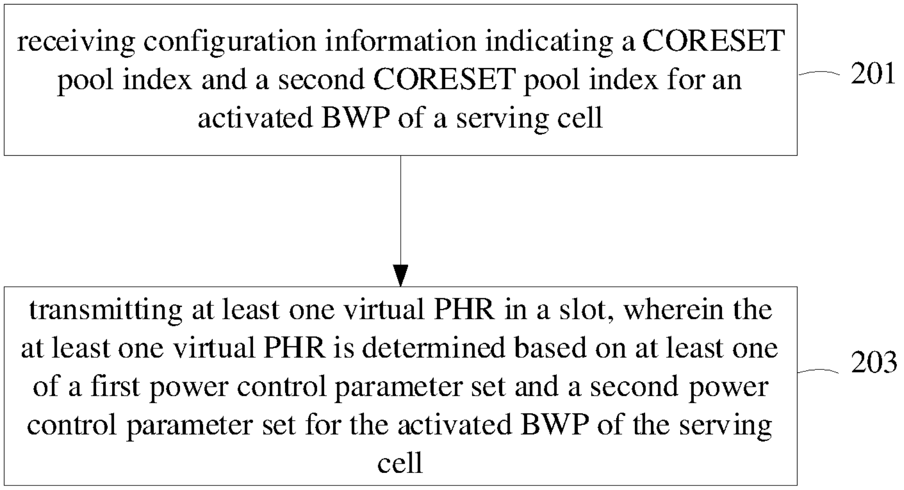
FIG. 2 is a flow chart illustrating an exemplary method for determining virtual PHR according to some embodiments of the present application.

FIG. 2 is a flow chart illustrating an exemplary method for determining virtual PHR according to some embodiments of the present application. The method illustrated in FIG. 2 may be implemented by a UE (e.g., UE 105*a*, UE 105*b* or UE 105*c* as shown in FIG. 1) or any other device having similar functions.

In the exemplary method shown in FIG. 2, in step 201, the UE may receive configuration information from a BS (e.g., BS 101 as shown in FIG. 1). The configuration information may indicate a first CORESET pool index (e.g., 0) and a second CORESET pool index (e.g., 1) for an activated BWP (e.g., UL BWP) of a serving cell of the UE.

For example, the configuration information may include one or more CORESETs in the activated BWP of the serving cell which supports M-DCI based M-TRP transmission. Each CORESET of the one or more CORESETs may be configured with either the first CORESET pool index or the second CORESET pool index. Each of the first CORESET pool index and the second CORESET pool index may be used to identify a corresponding TRP. For example, the first CORESET pool index may correspond to a first TRP and the second CORESET pool index may correspond to a second TRP.

Given this, when a PUSCH transmission is scheduled by a DCI (e.g., in the case that the PUSCH transmission is a dynamic grant (DG) PUSCH transmission as specified in 3GPP standard documents), or activated by a DCI (e.g., in the case that the PUSCH transmission is a Type 2 configured grant (CG) PUSCH transmission as specified in 3GPP standard documents), or configured by a radio resource control (RRC) signaling (e.g., in the case that the PUSCH transmission is a Type 1 CG PUSCH transmission as specified in 3GPP standard documents), the PUSCH transmission may be associated with either the first CORESET pool index or the second CORESET pool index based on the scheduling DCI, the activating DCI, or the RRC signaling.

Then, in step 203, the UE may transmit at least one virtual PHR in a slot for the activated BWP of the serving cell. For example, the slot for transmitting the at least one virtual PHR may be determined based on a PHR triggering event as specified in 3GPP standard documents. In some embodiments, the at least one virtual PHR may be transmitted in a PUSCH transmission in the slot. For example, the at least one virtual PHR may be included in a medium access control (MAC) control element (CE), which may be referred to as a PHR MAC CE, carried by the PUSCH transmission.

In some embodiments, each of the at least one virtual PHR may be a Type 1 virtual PHR as specified in 3GPP standard documents. In some other embodiments, each of the at least one virtual PHR may be other type of virtual PHR.

The at least one virtual PHR may be determined based on at least one of a first power control parameter set and a second power control parameter set for the activated BWP of the serving cell. The first power control parameter set may include a first PL-RS and a first set of power control parameters except for PL-RS. For example, the first set of power control parameters except for PL-RS may include at least one of the following parameters: p0, alpha, and closed loop index as specified in 3GPP standard documents. The second power control parameter set may include a second PL-RS and a second set of power control parameters except for PL-RS. For example, the second set of power control parameters except for PL-RS may include at least one of the following parameters: p0, alpha, and closed loop index as specified in 3GPP standard documents.

In some embodiments, the first power control parameter set or the second power control parameter set may be used for determining a virtual PHR based on the formula as specified in TS38.213.

The following embodiments may relate to how to determine the first power control parameter set and the second power control parameter set for virtual PHR determination. Specifically, there are two cases (Case 1 and Case 2) for determining the first power control parameter set and the second power control parameter set.

Case 1

In Case 1, the first power control parameter set may be associated with the first CORESET pool index and the second power control parameter set may be associated with the second CORESET pool index. For each power control parameter set, the PL-RS and the set of power control parameters except for PL-RS may be determined separately.

The following solutions 1-3 provide embodiments for determining the first PL-RS in the first power control parameter set and the second PL-RS in the second power control parameter set in Case 1.

Solution 1

In solution 1, a first set of TCI codepoints each including at least one joint or UL common TCI state associated with the first CORESET pool index may be activated, e.g., by a first MAC CE from the BS, and a second set of TCI codepoints each including at least one joint or UL common TCI state associated with the second CORESET pool index may be activated, e.g., by a second MAC CE from the BS. The first MAC CE and the second MAC CE may be the same MAC CE or different MAC CEs.

According to an embodiment of the present application, the first PL-RS may be associated with or included in a joint or UL common TCI state with a lowest TCI codepoint among the activated first set of TCI codepoints, and the second PL-RS may be associated with or included in a joint or UL common TCI state with a lowest TCI codepoint among the activated second set of TCI codepoints.

Solution 2

In solution 2, a first joint or UL common TCI state associated with the first CORESET pool index and applicable for UL transmission associated with the first CORESET pool index in the slot where the at least one virtual PHR is to be transmitted is indicated by a first DCI or a first MAC CE; and a second joint or UL common TCI state associated with the second CORESET pool index and applicable for UL transmission associated with the second CORESET pool index in the slot where the at least one virtual PHR is to be transmitted is indicated by a second DCI or a second MAC CE. The first DCI and the second DCI are different DCIs. The first MAC CE and the second MAC CE may be the same MAC CE or different MAC CEs.

According to an embodiment of the present application, the first PL-RS may be associated with or included in the first joint or UL common TCI state, and the second PL-RS may be associated with or included in the second joint or UL common TCI state.

Solution 3

In solution 3, the BS may configure one or more PL-RS lists for PUSCH transmission of the activated BWP of the serving cell.

According to an embodiment of the present application, when only one PL-RS list is configured, the first PL-RS may be a PL-RS with the lowest ID (e.g., PL-RS with ID being 0) in the configured PL-RS list, and the second PL-RS may be a PL-RS with the second lowest ID (e.g., PL-RS with ID being 1) in the configured PL-RS list; when two PL-RS lists are configured, which include a first PL-RS list associated with the first CORESET pool index and a second PL-RS list associated with the second CORESET pool index, the first PL-RS may be a PL-RS with the lowest ID (e.g., PL-RS with ID being 0) in the first PL-RS list, and the second PL-RS may be a PL-RS with the lowest ID (e.g., PL-RS with ID being 0) in the second PL-RS list. In an embodiment, the association relationship between each PL-RS list of the two PL-RS lists and each CORESET pool index of the two CORESET pool indexes may be configured by a signaling from the BS (e.g., an RRC signaling) or may be pre-configured or pre-defined (e.g., fixed in the 3GPP standard documents).

The following solutions 4-8 provide embodiments for determining the first set of power control parameters except for PL-RS and the second set of power control parameters except for PL-RS in Case 1.

Solution 4

In solution 4, a first set of TCI codepoints each including at least one joint or UL common TCI state associated with the first CORESET pool index may be activated, e.g., by a first MAC CE from the BS, and a second set of TCI codepoints each including at least one joint or UL common TCI state associated with the second CORESET pool index may be activated, e.g., by a second MAC CE from the BS. The first MAC CE and the second MAC CE may be the same MAC CE or different MAC CEs.

In some embodiments, if a joint or UL common TCI state with a lowest TCI codepoint among the activated first set of TCI codepoints is associated with a parameter set (e.g., identified by a p0_Alpha_CLIdPUSCHSetId as specified in 3GPP standard documents) within a list of parameter sets for power control (e.g., represented by p0_Alpha_CLIdPUSCHSet as specified in 3GPP standard documents) configured for PUSCH transmission in the activated BWP of the serving cell, then the first set of power control parameters except for PL-RS may be determined based on the aforementioned parameter set associated with the joint or UL common TCI state with the lowest TCI codepoint among the activated first set of TCI codepoints.

Otherwise, in the case that only one list of parameter sets for PUSCH power control (e.g., represented by p0_Alpha_CLIdPUSCHSet as specified in 3GPP standard documents) is configured for the activated BWP of the serving cell, the first set of power control parameters except for PL-RS may be determined based on a parameter set with the lowest ID (e.g., p0_Alpha_CLIdPUSCHSetId being 0) in the configured list of parameter sets; in the case that two lists of parameter sets for PUSCH power control (e.g., respectively represented by p0_Alpha_CLIdPUSCHSet and p0_Alpha_CLIdPUSCHSet2 as specified in 3GPP standard documents) are configured for the activated BWP of the serving cell, which include a first list of parameter sets associated with the first CORESET pool index and a second list of parameter sets associated with the second CORESET pool index, the first set of power control parameters except for PL-RS may be determined based on a parameter set with the lowest ID (e.g., p0_Alpha_CLIdPUSCHSetId being 0) in the first list of parameter sets. In an embodiment, the association relationship between the two configured list of parameter sets (e.g., p0_Alpha_CLIdPUSCHSet and p0_Alpha_CLIdPUSCHSet2) and the two CORESET pool indexes may be configured by a signaling from the BS (e.g., an RRC signaling) or may be pre-configured or pre-defined (e.g., fixed in the 3GPP standard documents).

In some embodiments, if a joint or UL common TCI state with a lowest TCI codepoint among the activated second set of TCI codepoints is associated with a parameter set (e.g., identified by a p0_Alpha_CLIdPUSCHSetId as specified in 3GPP standard documents) within a list of parameter sets for power control (e.g., represented by p0_Alpha_CLIdPUSCHSet as specified in 3GPP standard documents) configured for PUSCH transmission in the activated BWP of the serving cell, then the second set of power control parameters except for PL-RS may be determined based on the aforementioned parameter set associated with the joint or UL common TCI state with the lowest TCI codepoint among the activated second set of TCI codepoints.

Otherwise, in the case that only one list of parameter sets for PUSCH power control (e.g., represented by p0_Alpha_CLIdPUSCHSet as specified in 3GPP standard documents) is configured for the activated BWP of the serving cell, the second set of power control parameters except for PL-RS may be determined based on a parameter set with the second lowest ID (e.g., p0_Alpha_CLIdPUSCHSetId being 1) in the configured list of parameter sets; in the case that two lists of parameter sets for PUSCH power control (e.g., respectively represented by p0_Alpha_CLIdPUSCHSet and p0_Alpha_CLIdPUSCHSet2 as specified in 3GPP standard documents) are configured for the activated BWP of the serving cell, which include a first list of parameter sets associated with the first CORESET pool index and a second list of parameter sets associated with the second CORESET pool index, the second set of power control parameters except for PL-RS may be determined based on a parameter set with the lowest ID (e.g., p0_Alpha_CLIdPUSCHSetId being 0) in the second list of parameter sets.

Solution 5

In solution 5, a first joint or UL common TCI state associated with the first CORESET pool index and applicable for UL transmission associated with the first CORESET pool index in the slot where the at least one virtual PHR is to be transmitted is indicated by a first DCI or a first MAC CE; and a second joint or UL common TCI state associated with the second CORESET pool index and applicable for UL transmission associated with the second CORESET pool index in the slot where the at least one virtual PHR is to be transmitted is indicated by a second DCI or a second MAC CE. The first DCI and the second DCI are different DCIs. The first MAC CE and the second MAC CE may be the same MAC CE or different MAC CEs.

In some embodiments, if the first joint or UL common TCI state is associated with a parameter set (e.g., identified by a p0_Alpha_CLIdPUSCHSetId as specified in 3GPP standard documents) within a list of parameter sets for power control (e.g., represented by p0_Alpha_CLIdPUSCHSet as specified in 3GPP standard documents) configured for PUSCH transmission in the activated BWP of the serving cell, then the first set of power control parameters except for PL-RS may be determined based on the aforementioned parameter set associated with the first joint or UL common TCI state.

Otherwise, in the case that only one list of parameter sets for PUSCH power control (e.g., represented by p0_Alpha_CLIdPUSCHSet as specified in 3GPP standard documents) is configured for the activated BWP of the serving cell, the first set of power control parameters except for PL-RS may be determined based on a parameter set with the lowest ID (e.g., p0_Alpha_CLIdPUSCHSetId being 0) in the configured list of parameter sets; in the case that two lists of parameter sets for PUSCH power control (e.g., respectively represented by p0_Alpha_CLIdPUSCHSet and p0_Alpha_CLIdPUSCHSet2 as specified in 3GPP standard documents) are configured for the activated BWP of the serving cell, which include a first list of parameter sets associated with the first CORESET pool index and a second list of parameter sets associated with the second CORESET pool index, the first set of power control parameters except for PL-RS may be determined based on a parameter set with the lowest ID (e.g., p0_Alpha_CLIdPUSCHSetId being 0) in the first list of parameter sets. In an embodiment, the association relationship between the two configured list of parameter sets (e.g., p0_Alpha_CLIdPUSCHSet and p0_Alpha_CLIdPUSCHSet2) and the two CORESET pool indexes may be configured by a signaling from the BS (e.g., an RRC signaling) or may be pre-configured or pre-defined (e.g., fixed in the 3GPP standard documents).

In some embodiments, if the second joint or UL common TCI state is associated with a parameter set (e.g., identified by a p0_Alpha_CLIdPUSCHSetId as specified in 3GPP standard documents) within a list of parameter sets for power control (e.g., represented by p0_Alpha_CLIdPUSCHSet as specified in 3GPP standard documents) configured for PUSCH transmission in the activated BWP of the serving cell, then the second set of power control parameters except for PL-RS may be determined based on the aforementioned parameter set associated with the second joint or UL common TCI state.

Otherwise, in the case that only one list of parameter sets for PUSCH power control (e.g., represented by p0_Alpha_CLIdPUSCHSet as specified in 3GPP standard documents) is configured for the activated BWP of the serving cell, the second set of power control parameters except for PL-RS may be determined based on a parameter set with the second lowest ID (e.g., p0_Alpha_CLIdPUSCHSetId being 1) in the configured list of parameter sets; in the case that two lists of parameter sets for PUSCH power control (e.g., respectively represented by p0_Alpha_CLIdPUSCHSet and p0_Alpha_CLIdPUSCHSet2 as specified in 3GPP standard documents) are configured for the activated BWP of the serving cell, which include a first list of parameter sets associated with the first CORESET pool index and a second list of parameter sets associated with the second CORESET pool index, the second set of power control parameters except for PL-RS may be determined based on a parameter set with the lowest ID (e.g., p0_Alpha_CLIdPUSCHSetId being 0) in the second list of parameter sets.

Solution 6

In some embodiments, in the case that only one list of parameter sets for PUSCH power control (e.g., represented by p0_Alpha_CLIdPUSCHSet as specified in 3GPP standard documents) is configured for the activated BWP of the serving cell, the first set of power control parameters except for PL-RS may be determined based on a parameter set with the lowest ID (e.g., p0_Alpha_CLIdPUSCHSetId being 0) in the configured list of parameter sets, and the second set of power control parameters except for PL-RS may be determined based on a parameter set with the second lowest ID (e.g., p0_Alpha_CLIdPUSCHSetId being 1) in the configured list of parameter sets.

In the case that two lists of parameter sets for PUSCH power control (e.g., respectively represented by p0_Alpha_CLIdPUSCHSet and p0_Alpha_CLIdPUSCHSet2 as specified in 3GPP standard documents) are configured for the activated BWP of the serving cell, which include a first list of parameter sets associated with the first CORESET pool index and a second list of parameter sets associated with the second CORESET pool index, the first set of power control parameters except for PL-RS may be determined based on a parameter set with the lowest ID (e.g., p0_Alpha_CLIdPUSCHSetId being 0) in the first list of parameter sets, and the second set of power control parameters except for PL-RS may be determined based on a parameter set with the lowest ID (e.g., p0_Alpha_CLIdPUSCHSetId being 0) in the second list of parameter sets. In an embodiment, the association relationship between the two configured list of parameter sets (e.g., p0_Alpha_CLIdPUSCHSet and p0_Alpha_CLIdPUSCHSet2) and the two CORESET pool indexes may be configured by a signaling from the BS (e.g., an RRC signaling) or may be pre-configured or pre-defined (e.g., fixed in the 3GPP standard documents).

Solution 7

In solution 7, both the first set of power control parameters except for PL-RS and the second set of power control parameters except for PL-RS are determined based on a parameter set with the lowest ID (e.g., p0_Alpha_CLIdPUSCHSetId being 0) in a list of parameter sets for PUSCH power control (e.g., represented by p0_Alpha_CLIdPUSCHSet as specified in 3GPP standard documents). In other words, the first set of power control parameters except for PL-RS and the second set of power control parameters are the same.

Solution 8

In solution 8, p0 and alpha in the first set of power control parameters except for PL-RS and those in the second set of power control parameters except for PL-RS may be determined based on any of the above solutions 4-7 in Case 1.

In some embodiments, in the case that p0 and alpha in each of the first set of power control parameters except for PL-RS and the second set of power control parameters except for PL-RS are determined based on any of the above solutions 4-6 in Case 1, a closed loop index in the first set of power control parameters except for PL-RS may be determined to be 0. A closed loop index in the second set of power control parameters except for PL-RS may be determined to be 1 in the case that two closed loop indexes are configured (e.g., twoPUSCH-PC-AdjustmentStates as specified in 3GPP standard documents is configured), and determined to be 0 in the case that only one closed loop index is configured (e.g., twoPUSCH-PC-AdjustmentStates as specified in 3GPP standard documents is not configured).

In the case that p0 and alpha in each of the first set of power control parameters except for PL-RS and the second set of power control parameters except for PL-RS are determined based on the above solution 7 in Case 1, both a closed loop index in the first set of power control parameters except for PL-RS and a closed loop index in the second set of power control parameters except for PL-RS are determined to be 0.

Based on the first power control parameter set and the second power control parameter set as determined above, the virtual PHR associated with the first CORESET pool index may be determined based on the first power control parameter set, and the virtual PHR associated with the second CORESET pool index may be determined based on the second power control parameter set, which will be described later.

Case 2

In Case 2, the UE may receive configuration information indicating two SRS resource sets in the activated BWP of the serving cell for PUSCH transmission, wherein a first SRS resource set in the two SRS resource sets is an SRS resource set having a lower ID in the two SRS resource sets, and a second SRS resource set in the two SRS resource sets is an SRS resource having a higher ID in the two SRS resource sets. According to some embodiments of the present application, each joint or UL common beam (corresponding to joint or UL common TCI state) in a TCI codepoint for the activated BWP of the serving cell activated in one MAC CE or two MAC CEs may be associated with the first SRS resource set or the second SRS resource set. In an embodiment, the association relationship between an activated joint or UL common beam and an SRS resource set may be configured by the BS via RRC signaling, MAC CE, or DCI signaling.

In case 2, the first power control parameter set may be associated with the first SRS resource set and the second power control parameter set may be associated with the second resource set. Similar to Case 1, for each power control parameter set, the PL-RS and the set of power control parameters except for PL-RS may be determined separately in Case 2.

The following solutions 1-3 provide embodiments for determining the first PL-RS in the first power control parameter set and the second first PL-RS in the second power control parameter set in Case 2.

Solution 1

In solution 1, the first PL-RS may be associated with or included in a joint or UL common TCI state with a lowest TCI codepoint among a first set of activated TCI codepoints each including at least one joint or UL common TCI state associated with the first SRS resource set, and the second PL-RS may be associated with or included in a joint or UL common TCI state with a lowest TCI codepoint among a second set of activated TCI codepoints each including at least one joint or UL common TCI state associated with the second SRS resource set.

Solution 2

In solution 2, a first joint or UL common TCI state associated with the first SRS resource set and applicable for UL transmission associated with the first SRS resource set in the slot where the at least one virtual PHR is to be transmitted is indicated by a first DCI or a first MAC CE; and a second joint or UL common TCI state associated with the second SRS resource set and applicable for UL transmission associated with the second SRS resource set in the slot where the at least one virtual PHR is to be transmitted is indicated by a second DCI or a second MAC CE. The first DCI and the second DCI are different DCIs. The first MAC CE and the second MAC CE may be the same MAC CE or different MAC CEs.

According to an embodiment of the present application, the first PL-RS may be associated with or included in the first joint or UL common TCI state, and the second PL-RS may be associated with or included in the second joint or UL common TCI state.

Solution 3

In solution 3, the BS may configure one or more PL-RS lists for PUSCH transmission of the activated BWP of the serving cell.

According to some embodiments of the present application, when only one PL-RS list is configured, the first PL-RS may be a PL-RS with the lowest ID (e.g., PL-RS with ID being 0) in the configured PL-RS list, and the second PL-RS may be a PL-RS with the second lowest ID (e.g., PL-RS with ID being 1) in the configured PL-RS list; when two PL-RS lists are configured, which include a first PL-RS list associated with the first SRS resource set and a second PL-RS list associated with the second SRS resource set, the first PL-RS may be a PL-RS with the lowest ID (e.g., PL-RS with ID being 0) in the first PL-RS list, and the second PL-RS may be a PL-RS with the lowest ID (e.g., PL-RS with ID being 0) in the second PL-RS list. In an embodiment, the association relationship between each PL-RS list of the two PL-RS lists and each SRS resource set of the two SRS resource sets may be configured by a signaling from the BS (e.g., an RRC signaling) or may be pre-configured or pre-defined (e.g., fixed in the 3GPP standard documents).

The following solutions 4-8 provide embodiments for determining the first set of power control parameters except for PL-RS and the second set of power control parameters except for PL-RS in Case 2.

Solution 4

In some embodiments, if a joint or UL common TCI state with a lowest TCI codepoint among a first set of activated TCI codepoints each including at least one joint or UL common TCI state associated with the first SRS resource set is associated with a parameter set (e.g., identified by a p0_Alpha_CLIdPUSCHSetId as specified in 3GPP standard documents) within a list of parameter sets for power control (e.g., represented by p0_Alpha_CLIdPUSCHSet as specified in 3GPP standard documents) configured for PUSCH transmission in the activated BWP of the serving cell, then the first set of power control parameters except for PL-RS may be determined based on the aforementioned parameter set associated with the joint or UL common TCI state with the lowest TCI codepoint among the first set of activated TCI codepoints each including at least one joint or UL common TCI state associated with the first SRS resource set.

Otherwise, in the case that only one list of parameter sets for PUSCH power control (e.g., represented by p0_Alpha_CLIdPUSCHSet as specified in 3GPP standard documents) is configured for the activated BWP of the serving cell, the first set of power control parameters except for PL-RS may be determined based on a parameter set with the lowest ID (e.g., p0_Alpha_CLIdPUSCHSetId being 0) in the configured list of parameter sets; in the case that two lists of parameter sets for PUSCH power control (e.g., respectively represented by p0_Alpha_CLIdPUSCHSet and p0_Alpha_CLIdPUSCHSet2 as specified in 3GPP standard documents) are configured for the activated BWP of the serving cell, which include a first list of parameter sets associated with the first SRS resource set and a second list of parameter sets associated with the second SRS resource set, the first set of power control parameters except for PL-RS may be determined based on a parameter set with the lowest ID (e.g., p0_Alpha_CLIdPUSCHSetId being 0) in the first list of parameter sets. In an embodiment, the association relationship between the two configured list of parameter sets (e.g., p0_Alpha_CLIdPUSCHSet and p0_Alpha_CLIdPUSCHSet2) and the two SRS resource sets may be configured by a signaling from the BS (e.g., an RRC signaling) or may be pre-configured or pre-defined (e.g., fixed in the 3GPP standard documents).

In some embodiments, if a joint or UL common TCI state with a lowest TCI codepoint among a second set of activated TCI codepoints each including at least one joint or UL common TCI state associated with the second SRS resource set is associated with a parameter set (e.g., identified by a p0_Alpha_CLIdPUSCHSetId as specified in 3GPP standard documents) within a list of parameter sets for power control (e.g., represented by p0_Alpha_CLIdPUSCHSet as specified in 3GPP standard documents) configured for PUSCH transmission in the activated BWP of the serving cell, then the second set of power control parameters except for PL-RS may be determined based on the aforementioned parameter set associated with the joint or UL common TCI state with the lowest TCI codepoint among the second set of activated TCI codepoints each including at least one joint or UL common TCI state associated with the second SRS resource set.

Otherwise, in the case that only one list of parameter sets for PUSCH power control (e.g., represented by p0_Alpha_CLIdPUSCHSet as specified in 3GPP standard documents) is configured for the activated BWP of the serving cell, the second set of power control parameters except for PL-RS may be determined based on a parameter set with the second lowest ID (e.g., p0_Alpha_CLIdPUSCHSetId being 1) in the configured list of parameter sets; in the case that two lists of parameter sets for PUSCH power control (e.g., respectively represented by p0_Alpha_CLIdPUSCHSet and p0_Alpha_CLIdPUSCHSet2 as specified in 3GPP standard documents) are configured for the activated BWP of the serving cell, which include a first list of parameter sets associated with the first SRS resource set and a second list of parameter sets associated with the SRS resource set, the second set of power control parameters except for PL-RS may be determined based on a parameter set with the lowest ID (e.g., p0_Alpha_CLIdPUSCHSetId being 0) in the second list of parameter sets.

Solution 5

In solution 5, a first joint or UL common TCI state associated with the first SRS resource set and applicable for UL transmission associated with the first SRS resource set in the slot where the at least one virtual PHR is to be transmitted is indicated by a first DCI or a first MAC CE; and a second joint or UL common TCI state associated with the second SRS resource set and applicable for UL transmission associated with the second SRS resource set in the slot where the at least one virtual PHR is to be transmitted is indicated by a second DCI or a second MAC CE. The first DCI and the second DCI are different DCIs. The first MAC CE and the second MAC CE may be the same MAC CE or different MAC CEs.

In some embodiments, if the first joint or UL common TCI state is associated with a parameter set (e.g., identified by a p0_Alpha_CLIdPUSCHSetId as specified in 3GPP standard documents) within a list of parameter sets for power control (e.g., represented by p0_Alpha_CLIdPUSCHSet as specified in 3GPP standard documents) configured for PUSCH transmission in the activated BWP of the serving cell, then the first set of power control parameters except for PL-RS may be determined based on the aforementioned parameter set associated with the first joint or UL common TCI state.

Otherwise, in the case that only one list of parameter sets for PUSCH power control (e.g., represented by p0_Alpha_CLIdPUSCHSet as specified in 3GPP standard documents) is configured for the activated BWP of the serving cell, the first set of power control parameters except for PL-RS may be determined based on a parameter set with the lowest ID (e.g., p0_Alpha_CLIdPUSCHSetId being 0) in the configured list of parameter sets; in the case that two lists of parameter sets for PUSCH power control (e.g., respectively represented by p0_Alpha_CLIdPUSCHSet and p0_Alpha_CLIdPUSCHSet2 as specified in 3GPP standard documents) are configured for the activated BWP of the serving cell, which include a first list of parameter sets associated with the first SRS resource set and a second list of parameter sets associated with the second SRS resource set, the first set of power control parameters except for PL-RS may be determined based on a parameter set with the lowest ID (e.g., p0_Alpha_CLIdPUSCHSetId being 0) in the first list of parameter sets. In an embodiment, the association relationship between the two configured list of parameter sets (e.g., p0_Alpha_CLIdPUSCHSet and p0_Alpha_CLIdPUSCHSet2) and the two SRS resource sets may be configured by a signaling from the BS (e.g., an RRC signaling) or may be pre-configured or pre-defined (e.g., fixed in the 3GPP standard documents).

In some embodiments, if the second joint or UL common TCI state is associated with a parameter set (e.g., identified by a p0_Alpha_CLIdPUSCHSetId as specified in 3GPP standard documents) within a list of parameter sets for power control (e.g., represented by p0_Alpha_CLIdPUSCHSet as specified in 3GPP standard documents) configured for PUSCH transmission in the activated BWP of the serving cell, then the second set of power control parameters except for PL-RS may be determined based on the aforementioned parameter set associated with the second joint or UL common TCI state.

Otherwise, in the case that only one list of parameter sets for PUSCH power control (e.g., represented by p0_Alpha_CLIdPUSCHSet as specified in 3GPP standard documents) is configured for the activated BWP of the serving cell, the second set of power control parameters except for PL-RS may be determined based on a parameter set with the second lowest ID (e.g., p0_Alpha_CLIdPUSCHSetId being 1) in the configured list of parameter sets; in the case that two lists of parameter sets for PUSCH power control (e.g., respectively represented by p0_Alpha_CLIdPUSCHSet and p0_Alpha_CLIdPUSCHSet2 as specified in 3GPP standard documents) are configured for the activated BWP of the serving cell, which include a first list of parameter sets associated with the first SRS resource set and a second list of parameter sets associated with the second SRS resource set, the second set of power control parameters except for PL-RS may be determined based on a parameter set with the lowest ID (e.g., p0_Alpha_CLIdPUSCHSetId being 0) in the second list of parameter sets.

Solution 6

In some embodiments, in the case that only one list of parameter sets or PUSCH power control (e.g., represented by p0_Alpha_CLIdPUSCHSet as specified in 3GPP standard documents) is configured for the activated BWP of the serving cell, the first set of power control parameters except for PL-RS may be determined based on a parameter set with the lowest ID (e.g., p0_Alpha_CLIdPUSCHSetId being 0) in the configured list of parameter sets; and the second set of power control parameters except for PL-RS may be determined based on a parameter set with the second lowest ID (e.g., p0_Alpha_CLIdPUSCHSetId being 1) in the configured list of parameter sets.

In the case that two lists of parameter sets for PUSCH power control (e.g., respectively represented by p0_Alpha_CLIdPUSCHSet and p0_Alpha_CLIdPUSCHSet2 as specified in 3GPP standard documents) are configured for the activated BWP of the serving cell, which include a first list of parameter sets associated with the first SRS resource set and a second list of parameter sets associated with the second SRS resource set, the first set of power control parameters except for PL-RS may be determined based on a parameter set with the lowest ID (e.g., p0_Alpha_CLIdPUSCHSetId being 0) in the first list of parameter sets, and the second set of power control parameters except for PL-RS may be determined based on a parameter set with the lowest ID (e.g., p0_Alpha_CLIdPUSCHSetId being 0) in the second list of parameter sets. In an embodiment, the association relationship between the two configured list of parameter sets (e.g., p0_Alpha_CLIdPUSCHSet and p0_Alpha_CLIdPUSCHSet2) and the two SRS resource sets may be configured by a signaling from the BS (e.g., an RRC signaling) or may be pre-configured or pre-defined (e.g., fixed in the 3GPP standard documents).

Solution 7

In solution 7, both the first set of power control parameters except for PL-RS and the second set of power control parameters except for PL-RS are determined based on a parameter set with the lowest ID (e.g., p0_Alpha_CLIdPUSCHSetId being 0) in a list of parameter sets for PUSCH power control (e.g., represented by p0_Alpha_CLIdPUSCHSet as specified in 3GPP standard documents). In other words, the first set of power control parameters except for PL-RS and the second set of power control parameters are the same.

Solution 8

In solution 8, p0 and alpha in the first set of power control parameters except for PL-RS and those in the second set of power control parameters except for PL-RS may be determined based on any of the above solutions 4-7 in Case 2.

In some embodiments, in the case that p0 and alpha in each of the first set of power control parameters except for PL-RS and the second set of power control parameters except for PL-RS are determined based on any of the above solutions 4-6 in Case 2, a closed loop index in the first set of power control parameters except for PL-RS may be determined to be 0. A closed loop index in the second set of power control parameters except for PL-RS may be determined to be 1 in the case that two closed loop indexes are configured (e.g., twoPUSCH-PC-AdjustmentStates as specified in 3GPP standard documents is configured), and determined to be 0 in the case that only one closed loop index is configured (e.g., twoPUSCH-PC-AdjustmentStates as specified in 3GPP standard documents is not configured).

In the case that p0 and alpha in each of the first set of power control parameters except for PL-RS and the second set of power control parameters except for PL-RS are determined based on the above solution 7 in Case 2, both a closed loop index in the first set of power control parameters except for PL-RS and a closed loop index in the second set of power control parameters except for PL-RS are determined to be 0.

Based on the first power control parameter set and the second power control parameter set as determined above, the virtual PHR associated with the first SRS resource set may be determined based on the first power control parameter set and the virtual PHR associated with the second SRS resource set may be determined based on the second power control parameter set, which will be described later.

As described above, in step 203, the UE may transmit at least one virtual PHR in a slot based on at least one of the first power control parameter set and the second power control parameter set determined based on any of the above methods. The number of virtual PHR(s) to be transmitted by the UE and the specific power control parameter set(s) used for generating the virtual PHR(s) may be determined based on a number of PHR(s) configured by the BS and a number of actual PHR(s) that will be transmitted in the slot.

According to some embodiments of the present application, the UE may receive configuration information indicating to report two PHRs (e.g., twoPHRMode as specified in 3GPP standard documents is enabled in the serving cell). In such embodiments, at least one virtual PHR will be reported if less than two actual PUSCH transmissions associated with two CORESET pool indexes or two SRS resource sets meet the timeline for determining two actual PHRs in the slot. For example, the timeline may be specified as follows in TS38.213.

> A UE determines whether a power headroom report for an activated serving cell [11, TS 38.321] is based on an actual transmission or a reference format based on the higher layer signalling of configured grant and periodic/semi-persistent sounding reference signal transmissions and downlink control information the UE received until and including the PDCCH monitoring occasion where the UE detects the first DCI format scheduling an initial transmission of a transport block since a power headroom report was triggered if the power headroom report is reported on a PUSCH triggered by the first DCI format. Otherwise, a UE determines whether a power headroom report is based on an actual transmission or a reference format based on the higher layer signalling of configured grant and periodic/semi-persistent sounding reference signal transmissions and downlink control information the UE received until the first uplink symbol of a configured PUSCH transmission minus $T'_{proc,2} = T_{proc,2}$ where $T_{proc,2}$ is determined according to [6, TS 38.214] assuming $d_{2,1} = 1$, $d_{2,2} = 0$, and with $\mu_{DL}$ corresponding to the subcarrier spacing of the active downlink BWP of the scheduling cell for a configured grant if the power headroom report is reported on the PUSCH using the configured grant.

In some embodiments, each virtual PHR of the at least one virtual PHR may be associated with the first CORESET pool index or the second CORESET pool index.

In such embodiments, if two virtual PHRs are determined to be reported in the slot, the UE may transmit a first virtual PHR associated with the first CORESET pool index and a second virtual PHR associated with the second CORESET pool index to the BS. The first virtual PHR may be determined based on the first power control parameter set determined according to any solution in Case 1, and the second virtual PHR may be determined based on the second power control parameter set determined according to any solution in Case 1. In some embodiments of the present application, the UE may transmit the first virtual PHR and the second virtual PHR in a MAC CE (e.g., a PHR MAC CE) carried by a PUSCH transmission in the slot.

If one actual PHR and one virtual PHR are determined to be reported in the slot, and the actual PHR is based on an actual PUSCH transmission which is associated with the first CORESET pool index, then the UE may transmit one virtual PHR associated with the second CORESET pool index to the BS. The virtual PHR may be determined based on the second power control parameter set determined according to any solution in Case 1. In some embodiments of the present application, the UE may transmit the virtual PHR in a MAC CE (e.g., a PHR MAC CE) carried by a PUSCH transmission in the slot.

If one actual PHR and one virtual PHR are determined to be reported in the slot, and the actual PHR is based on an actual PUSCH transmission which is associated with the second CORESET pool index, then the UE may transmit one virtual PHR associated with the first CORESET pool index to the BS. The virtual PHR may be determined based on the first power control parameter set determined according to any solution in Case 1. In some embodiments of the present application, the UE may transmit the virtual PHR in a MAC CE (e.g., a PHR MAC CE) carried by a PUSCH transmission in the slot.

In some other embodiments, each virtual PHR of the at least one virtual PHR may be associated with the first SRS resource set or the second SRS resource set.

In such embodiments, if two virtual PHRs are determined to be reported in the slot, the UE may transmit a first virtual PHR associated with the first SRS resource set and a second virtual PHR associated with the second SRS resource set to the BS. The first virtual PHR may be determined based on the first power control parameter set determined according to any solution in Case 2, and the second virtual PHR may be determined based on the second power control parameter set determined according to any solution in Case 2. In some embodiments of the present application, the UE may transmit the first virtual PHR and the second virtual PHR in a MAC CE (e.g., a PHR MAC CE) carried by a PUSCH transmission in the slot.

If one actual PHR and one virtual PHR are determined to be reported in the slot, and the actual PHR is based on an actual PUSCH transmission which is associated with the first SRS resource set, then the UE may transmit one virtual PHR associated with the second SRS resource set to the BS. The virtual PHR may be determined based on the second power control parameter set determined according to any solution in Case 2. In some embodiments of the present application, the UE may transmit the virtual PHR in a MAC CE (e.g., a PHR MAC CE) carried by a PUSCH transmission in the slot.

If one actual PHR and one virtual PHR are determined to be reported in the slot, and the actual PHR is based on an actual PUSCH transmission which is associated with second SRS resource set, then the UE may transmit one virtual PHR associated with the first SRS resource set to the BS. The virtual PHR may be determined based on the first power control parameter set determined according to any solution in Case 2. In some embodiments of the present application, the UE may transmit the virtual PHR in a MAC CE (e.g., a PHR MAC CE) carried by a PUSCH transmission in the slot.

According to some other embodiments of the present application, the UE may receive configuration information indicating to report only one PHR (e.g., twoPHRMode as specified in 3GPP standard documents is disabled in the serving cell). In such embodiments, one virtual PHR will be reported if no actual PUSCH transmission meets the timeline for determining an actual PHR in the slot, for example, as specified in TS38.213.

In some embodiments, the virtual PHR is always associated with the first CORESET pool index or the first SRS resource set.

For example, the UE may transmit the virtual PHR associated with the first CORESET pool index which is determined according to the first power control parameter set determined according to any solution in Case 1 to the BS. For example, the UE may transmit the virtual PHR associated with the first SRS resource set which is determined according to the first power control parameter set determined according to any solution in Case 2 to the BS. In some embodiments of the present application, the UE may transmit the virtual PHR in a MAC CE (e.g., a PHR MAC CE) carried by a PUSCH transmission in the slot.

In some other embodiments, the virtual PHR is associated with one CORESET pool index of the first CORESET pool index and the second CORESET pool index or one SRS resource set of the first SRS resource set or the second SRS resource set. In such embodiments, the UE may transmit an indication indicating which CORESET pool index or SRS resource set is associated with the virtual PHR to the BS.

For example, the UE may transmit a virtual PHR which is determined based on the first power control parameter set determined according to any solution in Case 1 and an indication indicating that the virtual PHR is associated with the first CORESET pool index; or the UE may transmit a virtual PHR which is determined based on the second power control parameter set determined according to any solution in Case 1 and an indication indicating that the virtual PHR is associated with the second CORESET pool index.

In some embodiments, the UE may transmit the virtual PHR and the indication in a MAC CE (e.g., a PHR MAC CE) carried by a PUSCH transmission in the slot. For example, the indication may be a 1-bit indication, wherein the value "0" indicates that the virtual PHR is associated the first CORESET pool index and the value "1" indicates that the virtual PHR is associated the second CORESET pool index, and vice versa.

For example, the UE may transmit a virtual PHR which is determined based on the first power control parameter set determined according to any solution in Case 2 and an indication indicating that the virtual PHR is associated with the first SRS resource set; or the UE may transmit a virtual PHR which is determined based on the second power control parameter set determined according to any solution in Case 2 and an indication indicating that the virtual PHR is associated with the second SRS resource set.

In some embodiments, the UE may transmit the virtual PHR and the indication in a MAC CE (e.g., a PHR MAC CE) carried by a PUSCH transmission in the slot. For example, the indication may be a 1-bit indication, wherein the value "0" indicates that the virtual PHR is associated the first SRS resource set and the value "1" indicates that the virtual PHR is associated the second SRS resource set, and vice versa.

Figure 3:
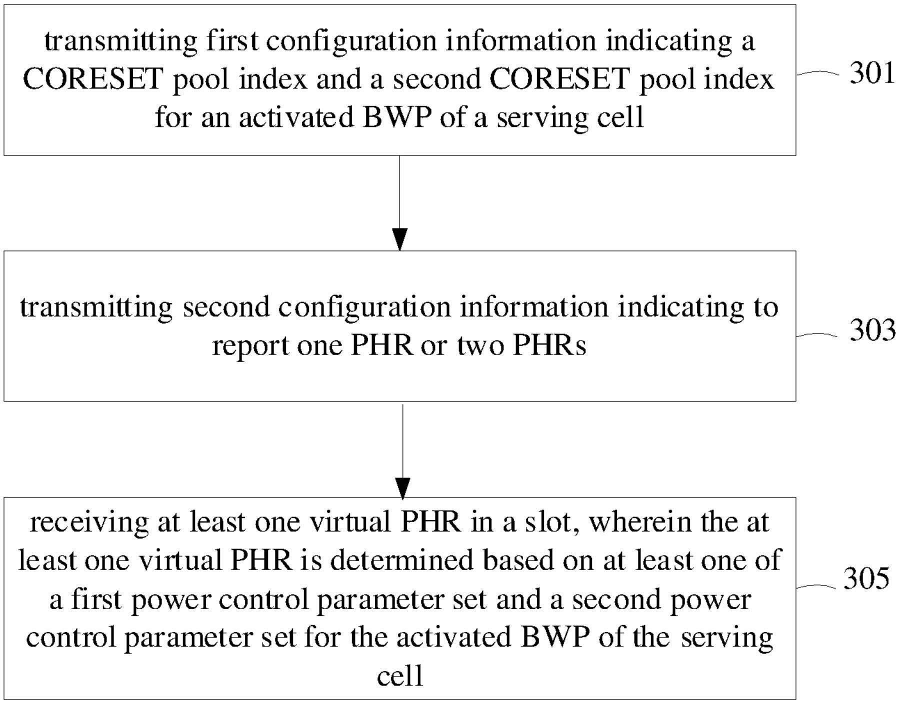
FIG. 3 is a flow chart illustrating another exemplary method for determining virtual PHR according to some embodiments of the present application.

FIG. 3 is a flow chart illustrating another exemplary method for determining virtual PHR according to some embodiments of the present application. The method illustrated in FIG. 3 may be implemented by a BS (e.g., BS 101 as shown in FIG. 1) or any other device having similar functions.

In the exemplary method shown in FIG. 3, in step 301, the BS may transmit first configuration information to a UE (e.g., UE 105*a*, UE 105*b* or UE 105*c* as shown in FIG. 1). The configuration information may indicate a first CORESET pool index (e.g., 0) and a second CORESET pool index (e.g., 1) for an activated BWP (e.g., UL BWP) of a serving cell of the UE.

For example, the configuration information may include one or more CORESETs in the activated BWP of the serving cell which supports M-DCI based M-TRP transmission. Each CORESET of the one or more CORESETs may be configured with either the first CORESET pool index or the second CORESET pool index. Each of the first CORESET pool index and the second CORESET pool index may be used to identify a corresponding TRP. For example, the first CORESET pool index may correspond to a first TRP and the second CORESET pool index may correspond to a second TRP.

Given this, when a PUSCH transmission is scheduled by a DCI (e.g., in the case that the PUSCH transmission is a DG PUSCH transmission as specified in 3GPP standard documents), or activated by a DCI (e.g., in the case that the PUSCH transmission is a Type 2 CG PUSCH transmission as specified in 3GPP standard documents), or configured by an RRC signaling (e.g., in the case that the PUSCH transmission is a Type 1 CG PUSCH transmission as specified in 3GPP standard documents), the PUSCH transmission may be associated with either the first CORESET pool index or the second CORESET pool index based on the scheduling DCI, the activating DCI, or the RRC signaling.

In step 303, the BS may transmit second configuration information indicating to the UE to report one PHR (e.g., twoPHRMode as specified in 3GPP standard documents is disabled or not configured in the serving cell) or two PHRs (e.g., twoPHRMode as specified in 3GPP standard documents is enabled in the serving cell).

Then, in step 305, the BS may receive at least one virtual PHR in a slot for the activated UL BWP of the serving cell, e.g., based on a PHR triggering event as specified in 3GPP standard documents. In some embodiments, the at least one virtual PHR may be received in a PUSCH transmission in the slot. For example, the at least one virtual PHR may be included in a MAC CE (e.g., PHR MAC CE) carried by the PUSCH transmission.

In some embodiments, each of the at least one virtual PHR may be a Type 1 virtual PHR as specified in 3GPP standard documents. In some other embodiments, each of the at least one virtual PHR may be other type of virtual PHR.

The at least one virtual PHR may be determined based on at least one of a first power control parameter set and a second power control parameter set for the activated BWP of the serving cell. The first power control parameter set is associated with the first CORESET pool index or a first SRS resource set, and may be determined by the UE based on any of the methods described with respect to FIG. 2. The second power control parameter set is associated with the second CORESET pool index or a second SRS resource set, and may be determined by the UE based on any of the methods described with respect to FIG. 2.

In some embodiments of the present application, the second configuration information may indicate to the UE to report two PHRs. In such embodiments, in step 305, the BS may receive one virtual PHR or two virtual PHRs from the UE, which may be determined by the UE based on any of the methods described with respect to FIG. 2.

In some embodiments of the present application, the second configuration information may indicate to the UE to report only one PHR. In such embodiments, in step 305, the BS may receive one virtual PHR which is associated with the first CORESET pool index or the first SRS resource set. Alternatively, in step 305, the BS may receive one virtual PHR which is determined based on the first power control parameter set or the second power control parameter set determined according to any solution in Case 1 or Case 2, and receive an indication indicating which CORESET pool index or SRS resource set is associated with the virtual PHR. In such cases, the virtual PHR and the indication may be received in a MAC CE (e.g., PHR MAC CE) carried by a PUSCH transmission.

Figure 4:
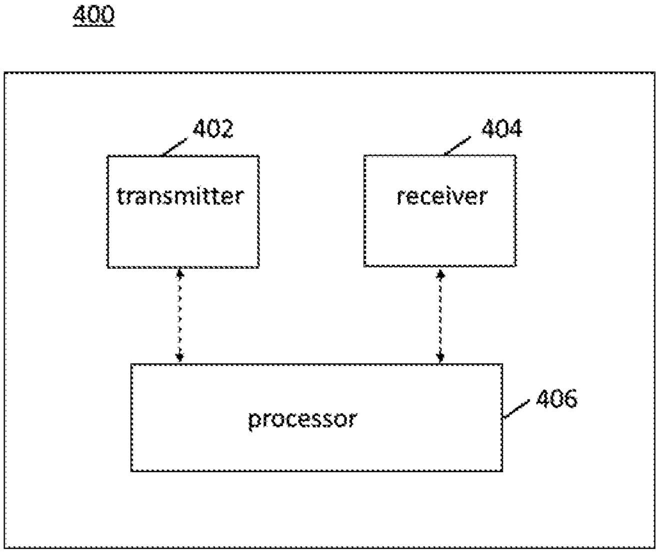
FIG. 4 illustrates a simplified block diagram of an exemplary apparatus for determining virtual PHR according to some embodiments of the present application.

FIG. 4 illustrates a simplified block diagram of an exemplary apparatus 400 for determining virtual PHR according to some embodiments of the present disclosure. In some embodiments, the apparatus 400 may be or include at least part of a UE (e.g., UE 105*a*, UE 105*b* or UE 105*c* in FIG. 1). In some other embodiments, the apparatus 400 may be or include at least part of a BS (e.g., BS 101 in FIG. 1).

Referring to FIG. 4, the apparatus 400 may include at least one transmitter 402, at least one receiver 404, and at least one processor 406. The at least one transmitter 402 is coupled to the at least one processor 406, and the at least one receiver 404 is coupled to the at least one processor 406.

Although in this figure, elements such as the transmitter 402, the receiver 404, and the processor 406 are illustrated in the singular, the plural is contemplated unless a limitation to the singular is explicitly stated. In some embodiments of the present disclosure, the transmitter 402 and the receiver 404 may be combined to one device, such as a transceiver. In some embodiments of the present disclosure, the apparatus 400 may further include an input device, a memory, and/or other components. The transmitter 402, the receiver 404, and the processor 406 may be configured to perform any of the methods described herein (e.g., the method described with respect to FIG. 2 or 3).

According to some embodiments of the present disclosure, the apparatus 400 may be a UE, and the transmitter 402, the receiver 404, and the processor 406 may be configured to perform operations of any method as described with respect to FIG. 2. For example, the receiver 404 may be configured to receive configuration information indicating a first CORESET pool index and a second CORESET pool index for an activated BWP of a serving cell. The transmitter 402 may be configured to transmit at least one virtual PHR in a slot, wherein the at least one virtual PHR is determined based on at least one of a first power control parameter set and a second power control parameter set for the activated BWP of the serving cell, wherein the first power control parameter set includes a first PL-RS and a first set of power control parameters except for PL-RS, and the second power control parameter set includes a second PL-RS and a second set of power control parameters except for PL-RS.

According to some embodiments of the present disclosure, the apparatus 400 may be a BS, and the transmitter 402, the receiver 404, and the processor 406 may be configured to perform operations of any method as described with respect to FIG. 3. For example, a transmitter 402 may be configured to: transmit first configuration information indicating a first CORESET pool index and a second CORESET pool index for an activated BWP of a serving cell; and transmit second configuration information indicating to report one PHR or two PHRs. The receiver 404 may be configured to receive at least one virtual PHR in a slot, wherein the at least one virtual PHR is determined based on at least one of a first power control parameter set and a second power control parameter set for the activated BWP of the serving cell, wherein the first power control parameter set is associated with the first CORESET pool index or a first SRS resource set, and the second power control parameter set is associated with the second CORESET pool index or a second SRS resource set.

In some embodiments of the present disclosure, the apparatus 400 may further include at least one non-transitory computer-readable medium. In some embodiments of the present disclosure, the non-transitory computer-readable medium may have stored thereon computer-executable instructions to cause the processor 406 to implement any of the methods as described above. For example, the computer-executable instructions, when executed, may cause the processor 406 to interact with the transmitter 402 and/or the receiver 404, so as to perform operations of the methods, e.g., as described with respect to FIGS. 2 and 3.

The method according to embodiments of the present disclosure can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present disclosure provides an apparatus of determining virtual PHR, including a processor and a memory. Computer programmable instructions for implementing a method for determining virtual PHR are stored in the memory, and the processor is configured to perform the computer programmable instructions to implement the method for determining virtual PHR. The method for determining virtual PHR may be any method as described in the present disclosure.

An alternative embodiment preferably implements the methods according to embodiments of the present disclosure in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present disclosure provides a non-transitory, computer-readable storage medium having computer programmable instructions stored therein. The computer programmable instructions are configured to implement a method for determining virtual PHR according to any embodiment of the present disclosure.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

In this disclosure, relational terms such as "first," "second," and the like may be used solely to distinguish one entity or action from another entity or action without necessarily requiring or implying any actual such relationship or order between such entities or actions, unless a relationship or order is explicitly specified. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A user equipment (UE), comprising:
at least one memory; and
at least one processor coupled with the at least one memory and configured to cause the UE to:
receive configuration information indicating a first control resource set (CORESET) pool index and a second CORESET pool index for an activated bandwidth part (BWP) of a serving cell; and
transmit at least one virtual power headroom report (PHR) in a slot, wherein the at least one virtual PHR is determined based on at least one of a first power control parameter set and a second power control parameter set for the activated BWP of the serving cell, wherein the first power control parameter set includes a first pathloss reference signal (PL-RS) and a first set of power control parameters except for PL-RS, and the second power control parameter set includes a second PL-RS and a second set of power control parameters except for PL-RS.

2. The UE of claim 1, wherein the first power control parameter set is associated with the first CORESET pool index and the second power control parameter set is associated with the second CORESET pool index.

3. The UE of claim 2, wherein the at least one processor is configured to cause the UE to receive second configuration information indicating to report two PHRs, and wherein in the case that two virtual PHRs are determined to be reported in the slot, the at least one processor is configured to cause the UE to:
transmit a first virtual PHR based on the first power control parameter set and a second virtual PHR based on the second power control parameter set.

4. The UE of claim 2, wherein the at least one processor is configured to cause the UE to receive second configuration information indicating to report two PHRs, and wherein in the case that one actual PHR and one virtual PHR are determined to be reported in the slot and the actual PHR is associated with one of the first CORESET pool index and the second CORESET pool index, the at least one processor is configured to cause the UE to:
transmit the one virtual PHR based on one power control parameter set of the first power control parameter set and the second power control parameter set which is associated with the other of the first CORESET pool index and the second CORESET pool index.

5. The UE of claim 2, wherein the at least one processor is configured to cause the UE to receive second configuration information indicating to report one PHR, and wherein in the case that one virtual PHR is determined to be reported in the slot, the at least one processor is configured to cause the UE to:
transmit the one virtual PHR based on the first power control parameter set.

6. The UE of claim 2,
wherein the at least one processor is configured to cause the UE to receive second configuration information indicating to report one PHR; and
wherein in the case that one virtual PHR is determined to be reported in the slot, the at least one processor is configured to cause the UE to:
transmit the one virtual PHR based on one power control parameter set of the first power control parameter set and the second power control parameter set; and transmit an indication indicating whether the one virtual PHR is associated with the first CORESET pool index or the second CORESET pool index.

7. The UE of claim 2, wherein the first PL-RS is associated with or included in a first joint or uplink (UL) common transmission configuration indicator (TCI) state with a lowest TCI codepoint among a first set of activated TCI codepoints each including at least one joint or UL common TCI state which is associated with the first CORESET pool index; and wherein the second PL-RS is associated with or included in a second joint or UL common TCI state with a lowest TCI codepoint among a second set of activated TCI codepoints each including at least one joint or UL common TCI state which is associated with the second CORESET pool index.

8. The UE of claim 2, wherein the first PL-RS is associated with or included in a first joint or uplink (UL) common transmission configuration indicator (TCI) state associated with the first CORESET pool index which is applicable for UL transmission associated with the first CORESET pool index in the slot; and wherein the second PL-RS is associated with or included in a second joint or UL common TCI state associated with the second CORESET pool index which is applicable for UL transmission associated with the second CORESET pool index in the slot.

9. The UE of claim 2, wherein in the case that one PL-RS list is configured for physical uplink shared channel (PUSCH) transmission of the activated BWP of the serving cell, the first PL-RS is a PL-RS with the lowest ID in the configured PL-RS list and the second PL-RS is a PL-RS with the second lowest ID in the configured PL-RS list; or wherein in the case that a first PL-RS list associated with the first CORESET pool index and a second PL-RS list associated with the second CORESET pool index are configured for PUSCH transmission of the activated BWP of the serving cell, the first PL-RS is a PL-RS with the lowest ID in the first PL-RS list and the second PL-RS is a PL-RS with the lowest ID in the second PL-RS list.

10. The UE of claim 2, wherein in the case that a first joint or uplink (UL) common transmission configuration (TCI) state with a lowest TCI codepoint among a first set of activated TCI codepoints each including at least one joint or UL common TCI state which is associated with the first CORESET pool index is associated with a first parameter set within a list of parameter sets for power control configured for physical uplink shared channel (PUSCH) transmission in the activated BWP of the serving cell, the first set of power control parameters except for PL-RS is determined based on the first parameter set;

otherwise, if one list of parameter sets for PUSCH power control is configured for the activated BWP of the serving cell, the first set of power control parameters except for PL-RS is determined based on a parameter set with the lowest ID in the configured list of parameter sets; or if a first list of parameter sets for PUSCH power control associated with the first CORESET pool index and a second list of parameter sets for PUSCH power control associated with the second CORESET pool index are configured for the activated BWP of the serving cell, the first set of power control parameters except for PL-RS is determined based on a parameter set with the lowest ID in the first list of parameter sets; and wherein in the case that a second joint or UL common TCI state with a lowest TCI codepoint among a second set of activated TCI codepoints each including at least one joint or UL common TCI state which is associated with the second CORESET pool index is associated with a second parameter set within a list of parameter sets for power control configured for PUSCH transmission in the activated BWP of the serving cell, the second set of power control parameters except for PL-RS is determined based on the second parameter set;

otherwise, if one list of parameter sets for PUSCH power control is configured for the activated BWP of the serving cell, the second set of power control parameters except for PL-RS is determined based on a parameter set with the second lowest ID in the configured list of parameter sets; or if a first list of parameter sets for PUSCH power control associated with the first CORESET pool index and a second list of parameter sets for PUSCH power control associated with the second CORESET pool index are configured for the activated BWP of the serving cell, the second set of power control parameters except for PL-RS is determined based on a parameter set with the lowest ID in the second list of parameter sets.

11. The UE of claim 2, wherein in the case that a first joint or uplink (UL) common transmission configuration (TCI) state associated with the first CORESET pool index which is applicable for UL transmission associated with the first CORESET pool index in the slot is associated with a first parameter set within a list of parameter sets for power control configured for physical uplink shared channel (PUSCH) transmission in the activated BWP of the serving cell, the first set of power control parameters except for PL-RS is determined based on the first parameter set;

otherwise, if one list of parameter sets for PUSCH power control is configured for the activated BWP of the serving cell, the first set of power control parameters except for PL-RS is determined based on a parameter set with the lowest ID in the configured list of parameter sets; or if a first list of parameter sets for PUSCH power control associated with the first CORESET pool index and a second list of parameter sets for PUSCH power control associated with the second CORESET pool index are configured for the activated BWP of the serving cell, the first set of power control parameters except for PL-RS is determined based on a parameter set with the lowest ID in the first list of parameter sets; and wherein in the case that a second joint or UL common TCI state associated with the second CORESET pool index which is applicable for UL transmission associated with the second CORESET pool index in the slot is associated with a second parameter set within a list of parameter sets for power control configured for PUSCH transmission in the activated BWP of the serving cell, the second set of power control parameters except for PL-RS is determined based on the second parameter set;

otherwise, if one list of parameter sets for PUSCH power control is configured for the activated BWP of the serving cell, the second set of power control parameters except for PL-RS is determined based on a parameter set with the second lowest ID in the configured list of parameter sets; or if a first list of parameter sets for PUSCH power control associated with the first CORESET pool index and a second list of parameter sets for PUSCH power control associated with the second CORESET pool index are configured for the activated BWP of the serving cell, the second set of power control parameters except for PL-RS is determined based on a parameter set with the lowest ID in the second list of parameter sets.

12. The UE of claim 2, wherein in the case that one list of parameter sets for PUSCH power control is configured for the activated BWP of the serving cell, the first set of power control parameters except for PL-RS is determined based on a parameter set with the lowest ID in the configured list of parameter sets and the second set of power control parameters except for PL-RS is determined based on a parameter set with the second lowest ID in the configured list of parameter sets; or wherein in the case that a first list of parameter sets for physical uplink shared channel (PUSCH) power control associated with the first CORESET pool index and a second list of parameter sets for PUSCH power control associated with the second CORESET pool index are configured for the activated BWP of the serving cell, the first set of power control parameters except for PL-RS is determined based on a parameter set with the lowest ID in the first list of parameter sets and the second set of power control parameters except for PL-RS is determined based on a parameter set with the lowest ID in the second list of parameter sets.

13. The UE of claim 1, wherein the at least one processor is configured to cause the UE to receive second configuration information indicating two sounding reference signal (SRS) resource sets for physical uplink shared channel (PUSCH) transmission, wherein the first power control parameter set is associated with a first SRS resource set which has the lower ID of the two SRS resource sets, and the second power control parameter set is associated with a second SRS resource set which has the higher ID of the two SRS resource sets.

14. The UE of claim 13, wherein the at least one processor is configured to cause the UE to receive third configuration information indicating to report two PHRs, and wherein in the case that two virtual PHRs are determined to be reported in the slot, the at least one processor is configured to cause the UE to:

transmit a first virtual PHR based on the first power control parameter set and a second virtual PHR based on the second power control parameter set.

15. The UE of claim 13, wherein the at least one processor is configured to cause the UE to receive third configuration information indicating to report two PHRs, and wherein in the case that one actual PHR and one virtual PHR are determined to be reported in the slot and the actual PHR is associated with one of the first SRS resource set and the second SRS resource set, the at least one processor is configured to cause the UE to:

transmit the one virtual PHR based on one power control parameter set of the first power control parameter set and the second power control parameter set which is associated with the other of the first SRS resource set and the second SRS resource set.

16. The UE of claim 13, wherein the at least one processor is configured to cause the UE to receive third configuration information indicating to report one PHR, and wherein in the case that one virtual PHR is determined to be reported in the slot, the at least one processor is configured to cause the UE to:

transmit the one virtual PHR based on the first power control parameter set.

17. The UE of claim 13, wherein the at least one processor is configured to cause the UE to receive third configuration information indicating to report one PHR; and wherein in the case that one virtual PHR is determined to be reported in the slot, the at least one processor is configured to cause the UE to:

transmit the one virtual PHR based on one power control parameter set of the first power control parameter set and the second power control parameter set; and transmit an indication indicating whether the one virtual PHR is associated with the first SRS resource set or the second SRS resource set.

18. A base station (BS), comprising:

at least one memory; and at least one processor coupled with the at least one memory and configured to cause the base station to:

transmit first configuration information indicating a first control resource set (CORESET) pool index and a second CORESET pool index for an activated bandwidth part (BWP) of a serving cell;

transmit second configuration information indicating to report one power headroom report (PHR) or two PHRs; and receive at least one virtual PHR in a slot, wherein the at least one virtual PHR is determined based on at least one of a first power control parameter set and a second power control parameter set for the activated BWP of the serving cell, wherein the first power control parameter set is associated with the first CORESET pool index or a first sounding reference signal (SRS) resource set, and the second power control parameter set is associated with the second CORESET pool index or a second SRS resource set.

19. A method performed by a user equipment (UE), the method comprising:

receiving configuration information indicating a first control resource set (CORESET) pool index and a second CORESET pool index for an activated bandwidth part (BWP) of a serving cell; and transmitting at least one virtual power headroom report (PHR) in a slot, wherein the at least one virtual PHR is determined based on at least one of a first power control parameter set and a second power control parameter set for the activated BWP of the serving cell, wherein the first power control parameter set includes a first pathloss reference signal (PL-RS) and a first set of power control parameters except for PL-RS, and the second power control parameter set includes a second PL-RS and a second set of power control parameters except for PL-RS.

20. A processor for wireless communication, comprising: at least one controller coupled with at least one memory and configured to cause the processor to:

receive configuration information indicating a first control resource set (CORESET) pool index and a second CORESET pool index for an activated bandwidth part (BWP) of a serving cell; and transmit at least one virtual power headroom report (PHR) in a slot, wherein the at least one virtual PHR is determined based on at least one of a first power control parameter set and a second power control parameter set for the activated BWP of the serving cell, wherein the first power control parameter set includes a first pathloss reference signal (PL-RS) and a first set of power control parameters except for PL-RS, and the second power control parameter set includes a second PL-RS and a second set of power control parameters except for PL-RS.

* * * * *